United States Patent
Back

[11] 3,922,549
[45] Nov. 25, 1975

[54] FOG PENETRATING VIEWING SYSTEM

[76] Inventor: Frank G. Back, 55 Sea Cliff Ave., Glen Cove, N.Y. 11542

[22] Filed: June 17, 1974

[21] Appl. No.: 479,648

[52] U.S. Cl. ............ 250/330; 250/333; 350/2
[51] Int. Cl.² .......... G02B 23/12; G02B 15/14; G02B 13/16
[58] Field of Search ............... 350/2, 1; 250/330–334, 339

[56] References Cited
UNITED STATES PATENTS

| | | | |
|---|---|---|---|
| 2,121,771 | 6/1938 | Jones | 250/330 |
| 2,231,170 | 2/1941 | Lindenblad | 250/330 |
| 3,723,902 | 3/1973 | Patel | 331/94.5 G |
| 3,825,315 | 7/1974 | Altman et al. | 350/2 |

OTHER PUBLICATIONS

McCubbin, *Jour. of the Optical Society of America*, Vol. 42, No. 11, Nov. 1952, p. 876, Abstract No. 47.

Jamieson, *Optica Acta* Vol. 18, No. 1, Jan. 1971, pp. 17–30.

Kurnick et al., *Jour. of the Optical Society of America*, Vol. 50, No. 6, June 1960, pp. 578–583.

Primary Examiner—Ronald J. Stern

[57] ABSTRACT

Visibility of objects through fog is achieved by the use of a low band pass filter which cuts out wavelengths below 10.5 microns and above 11.5 microns to eliminate the substantial masking effect caused by the reflection of the droplets in the fog. A varifocal lens system designed to transmit light in the 11 micron wavelength receives the light coming from fog obscured objects and directs it through the band pass filter. The light is then picked up by a pictorial detector.

1 Claim, 3 Drawing Figures

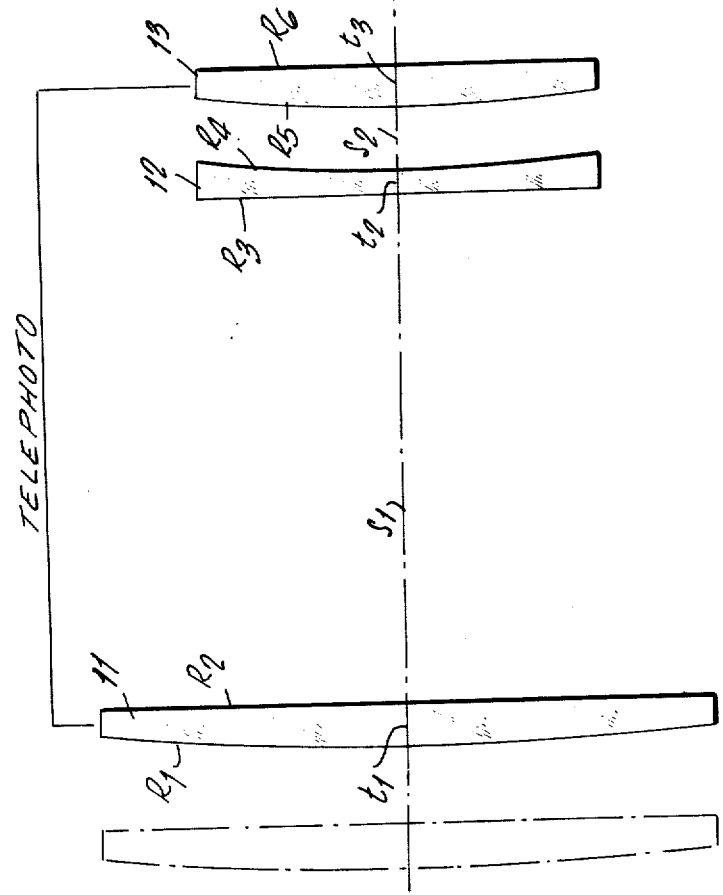
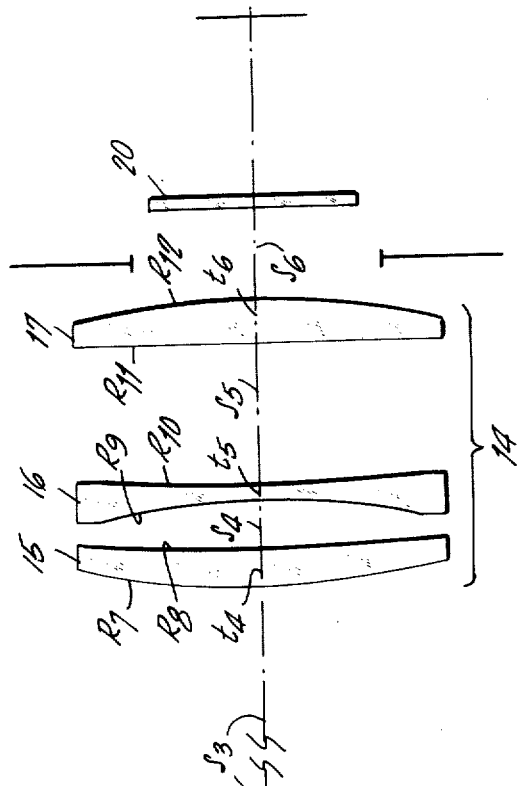
FIG.3

FOG PENETRATING VIEWING SYSTEM

BACKGROUND OF THE INVENTION

It is well-known to employ electronic devices such as Radar for determining the presence of objects hidden by fog. While such devices are adequate for aviation use and for certain military applications, they are not suited to most marine navigation. Radar and similar electronic systems do not give any information at close range. The objects seen on a Radar display can not be identified, and in fact look like a partial map with little or no resemblance to the actual scene being viewed.

Shipboard use makes it extremely important to see and recognize objects which are comparatively close to the ship in order to avoid collisions.

In the present invention the physical and optical nature of fog and the transmission of certain wavelengths of light through fog have been used to construct a viewing system capable of penetrating fog.

SUMMARY

In one preferred embodiment of the present invention, light coming from a fog enshrouded scene is received within a varifocal (zoom) lens with a high f/number, monochromatically corrected at 11 microns.

A band pass filter which cuts out all wavelengths of light below 10.5 microns and above 11.5 microns is carried within the varifocal lens behind the iris. The light passing through the band pass filter is directed into a pictorial detector such as a videcon type camera sensitive to a wave band of between 10 and 12 microns. An image of the scene may then be displayed on a television viewing screen.

DESCRIPTION OF THE DRAWINGS

In the accompanying drawings, forming part hereof, corresponding parts have been given the same reference numerals, in which drawings:

FIG. 3 is a showing similar to FIG. 2 in the telephoto position.

GENERAL DESCRIPTION

It has been found that fog is essentially an emulsion or suspension of water droplets in air. These water droplets are microscopically small, varying in size from approximately 1/2000mm (0.0005mm) to 60/1000mm (0.060mm). The great majority of the droplets have a diameter from 4.5 to 6 microns. Therefore fog, as well as clouds, can appear like a wall as the result of reflection. The reflection of these droplets to light is much greater than any light transmitted. The transmission of light through fog depends on the wavelength of the light and on the size of the water droplets. (See A. Armluf and J. Bricard *Transmission by Haze and Fog in the Spectoral Region* 0.35 to 10 Microns, Journal of the Optical Society of America, Vol. 47, No. 6, June 1951, P. 491–498.) From other optical and physical experiments, we find that any object size larger than half the wavelength of the transmitted light will cause dispersion and consequently reduce any transmission of light energy through the objects. At the same time, lightwaves with a smaller wavelength than the particle size will be reflected and will make the fogbank opaquely visible. The reflection in fog depends on the refractive index of the water droplets at the particular wavelength. The refractive index of water is not linear and has a peculiar anomaly. At a wavelength of 11 microns, it drops down to 1.1, and at larger and smaller wavelengths, it is considerably higher. Therefore, at a wavelength of approximately 11 microns, the refractive index of water is almost the same as in air and, according to the Fresnel law, the reflection becomes a minimum at this particular wavelength. Consequently, the reflection on water and on water droplets and also fog will be minimum at this wavelength.

On the other hand, this wavelength represents double the size of the great majority of the water droplets in fog and so the transmission of light through fog at a wavelength of 11 microns will be high. In order to look through fog, we therefore have to use a very narrow band of approximately 10½ microns to 11½ microns in order to obtain a minimum reflection with a good transmission.

At this wavelength, though, the resolution of any optical lens unit is not higher than about 10 lines/mm at f/1. Known pictorial receivers for this wavelength have only a resolution of 3–6 lines per mm. Therefore, it is desirable to use a varifocal (zoom) lens designed for a wavelength of 11 microns, monochromatic, with a high f/number and a zoom ratio of 3:1 in order to see enough area in the wide angle position and also have sufficient detail resolution in the telephoto position.

The necessary instrumentation will therefore consist of:

1. A zoom lens, f/1, of, for example, 40–130 focal length, monochromatically corrected for 11 microns.
2. A low band pass filter cutting out everything below 10.5 microns and above 11.5 microns.
3. A pictorial detector highly sensitive to a wavelength of 11 microns.

Figure 1:
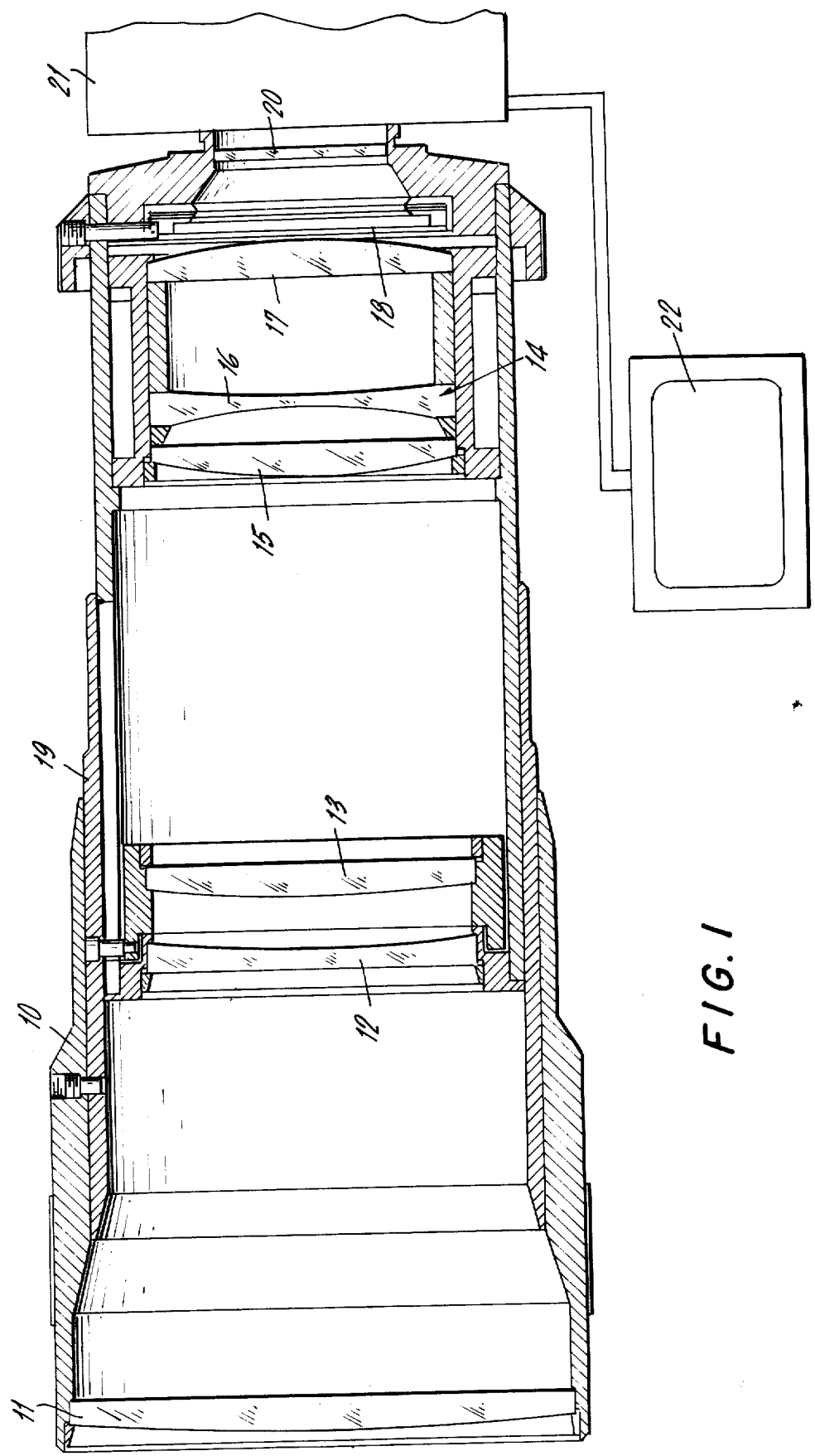
FIG. 1 is a somewhat diagrammatic view in side elevation of a complete embodiment of the present invention with the varifocal lens system shown in longitudinal section.

A zoom lens suitable for the present invention is shown at 10 in FIG. 1. The lens 10 is a six element lens in which the lens elements are made of an infra-red transmittant material such as germanium. Since germanium is highly reflective even when coated with an anti-reflecting layer it is important to keep the number of the lens elements to a minimum.

The lens elements in the zoom lens 10 consist of a front lens 11, an erector lens 12, a variator lens 13, and a relay 14 made up of lenses 15, 16, 17. A diaphragm 18 is carried by the zoom lens housing 19 behind the last element 17 of the relay 14.

A narrow band pass light filter 20 is disposed within the housing 19, adjacent the face of the diaphragh opposite the relay. The bank pass filter 20 permits only light having a wavelength of between 10.5 microns and 11.5 microns to be transmitted cutting out all wavelengths above and below this narrow range. In this narrow range as set forth above, there is the greatest transmission of light through fog.

Figure 2:
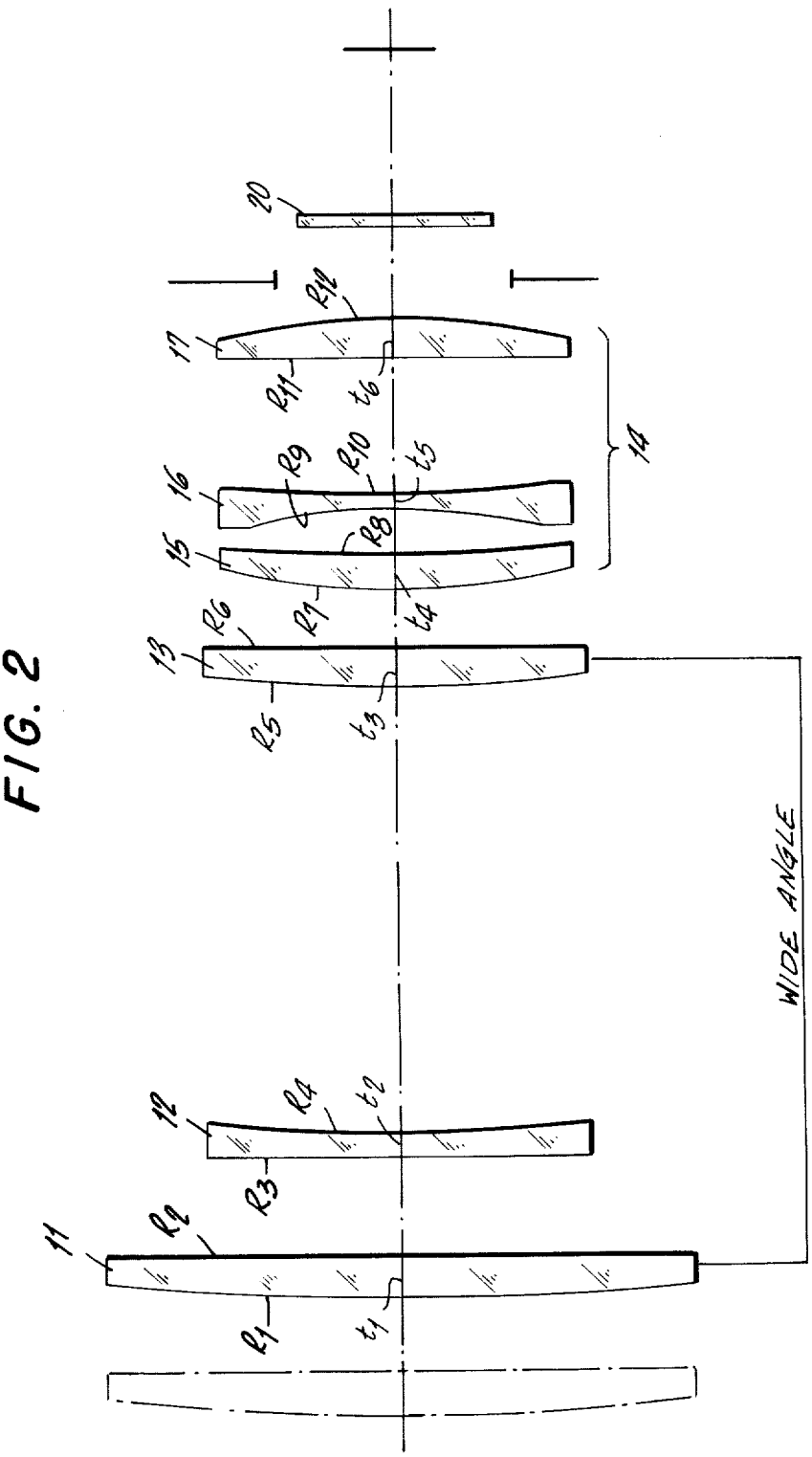
FIG. 2 is a diagrammatic showing of the zoom lens shown in FIG. 1 in the wide angle position.

As shown in FIGS. 2 and 3, the lens elements of the zoom lens 10 have the following optical characteristics:

| Lens No. | Radius R in mm | Thickness (t) Air Spacing (s) | Index of Refraction ND |
|---|---|---|---|
| Front Lens 11 | $R_1$= +570.17<br>$R_2$= −3159.56 | $t_1$=7.0<br>$s_1$=84.6 (17.4) | 4.00 |
| Erector 12 | $R_3$= −1253.83<br>$R_4$= −244.67 | $t_2$=4.4<br>$s_2$=10.4 (79.6) | 4.00 |
| Variator Lens 13 | $R_5$= +286.39<br>$R_6$= +4044.19 | $t_3$=7.0<br>$s_3$=76.8 (9.8) | 4.00 |
| Relay 15 | $R_7$= +124.41<br>$R_8$= −715.04 | $t_4$=7.0<br>$s_4$=7.2 | 4.00 |
| 16 | $R_9$= −108.09<br>$R_{10}$= −421.60 | $t_5$=2.8<br>$s_5$=23.0 | 4.00 |
| 17 | $R_{11}$=−3159.56<br>$R_{12}$= +130.09 | $t_6$=7.0<br>$s_6$=46.1 | 4.00 |

In the above table, the symbols designate the following:

ND is the refractive index for germanium $R_1$ to $R_{12}$ are the respective radii of refractive lens surfaces numbered from front to rear of the lens system; $t_1$ to $t_6$ are the respective axial thicknesses; $s_1$ to $s_6$ are the respective separations from the front to the rear of the lens systems in the telephoto position.

Equivalent focal length of the whole system (EFL)=$f$=40–130 mm

Back focal length from the last lens element to the focal plane = 46.1 mm

Travel of the front lens = 13 mm for focusing and 67 mm for zooming

Radius, thickness, and separation in millimeters.

Light passing through the band pass filter 20 is directed into a pictorial detector 21 such as a videocon type camera thermosensitive to a wave band of between 10 and 12 microns. The output of the detector 21 may be used for the provision of a video display 22 in accordance with well-known technology.

While the foregoing has been described in combination with the use of a varifocal (zoom) lens system it will be apparent that other lens systems such as a plurality of lenses on a turret may be employed provided the lens elements are made of germanium or similar materials having the same transmission properties, without departing from the spirit of the invention.

From the foregoing it will be seen that there has been provided a system for viewing fog enshrouded scenes which takes advantage of the narrow window of light transmission provided by the anomalous nature of the water droplets and air which form fog.

What is claimed is:

1. A fog penetrating viewing system comprising in combination, a varifocal lens system having a high $f$/number, monochromatically corrected at 11 microns to receive light from fog enveloped objects, a band pass filter to receive the light coming through the lens system and transmit only the wavelengths between 10.5 and 11.5 microns, a pictorial detector sensitive to a wave band between 10 and 12 microns to receive the light from the band pass filter, and means to convert the pictorial detector output into a visible image, in which the varifocal lens system has the following characteristics:

| Lens No. | Radius R in mm | Thickness (t) Air Spacing (s) | Index of Refraction ND |
|---|---|---|---|
| Front Lens 11 | $R_1$= +570.17<br>$R_2$= −3159.56 | $t_1$= 7.0<br>$s_1$= 84.6 (17.4) | 4.00 |
| Erector 12 | $R_3$= −1253.83<br>$R_4$= −244.67 | $t_2$= 4.4<br>$s_2$= 10.4 (79.6) | 4.00 |
| Variator Lens 13 | $R_5$= +286.39<br>$R_6$= +4044.19 | $t_3$= 7.0<br>$s_3$= 76.8 (9.8) | 4.00 |
| Relay 15 | $R_7$= +124.41<br>$R_8$= −715.04 | $t_4$= 7.0<br>$s_4$= 7.2 | 4.00 |
| 16 | $R_9$= −108.09<br>$R_{10}$=−421.60 | $t_5$= 2.8<br>$s_5$= 23.0 | 4.00 |
| 17 | $R_{11}$=−3159.56<br>$R_{12}$=+130.09 | $t_6$= 7.0<br>$s_6$= 46.1 | 4.00 |

In the above table, the symbols designate the following:

ND is the refractive index for germanium, $R_1$ to $R_{12}$ are the respective radii of refractive lens surfaces numbered from front to rear of the lens system, $t_1$ to $t_6$ are the respective axial thicknesses, $s_1$ to $s_6$ are the respective separations from the front to the rear of the lens systems in the telephoto position, Equivalent focal length of the whole system (EFL)=$f$=40–130 mm, Back focal length from the last lens element to the focal plane = 46.1 mm, Travel of the front lens = 13 mm for focusing and 67 mm for zooming, Radius, thickness, and separation in millimeters.

\* \* \* \* \*